United States Patent

Traubel et al.

[15] 3,644,233
[45] Feb. 22, 1972

[54] PROCESS FOR PREPARING MICROPOROUS FOILS FROM POLYURETHANES CONTAINING HYDRATED ELECTROLYTES

[72] Inventors: Harro Traubel; Harald Oertel, both of Farbenfabriken Bayer A.G., Leverkusen Bayerwerk, Germany

[22] Filed: July 18, 1968

[21] Appl. No.: 745,687

[30] Foreign Application Priority Data

Aug. 9, 1967 Germany..............................F 53187

[52] U.S. Cl..........................260/2.5 AY, 117/63, 117/135.5, 117/161 KP, 260/2.5 AK, 260/2.5 BD, 260/858, 260/859
[51] Int. Cl..................C08b 22/44, C08b 53/08, C09d 5/00
[58] Field of Search..............260/2.5 AX, 2.5 AY, 77.5 MP, 260/2.5 AK, 37 N, 2.5 M; 117/63, 135.5

[56] References Cited

UNITED STATES PATENTS

| | | | |
|---|---|---|---|
| 3,000,757 | 9/1961 | Johnston et al. | 117/63 |
| 3,100,721 | 8/1963 | Holden | 117/135.5 |
| 3,190,765 | 6/1965 | Yuan | 117/63 |
| 3,208,875 | 9/1965 | Holden | 117/135.5 |
| 3,379,658 | 4/1968 | Kemper | 260/2.5 |
| 3,486,968 | 12/1969 | Mater | 161/190 |
| 3,491,053 | 1/1970 | Sommer et al. | 260/30.8 |
| 3,496,001 | 2/1970 | Minobe et al. | 117/11 |
| 3,524,753 | 8/1970 | Sharp | 117/11 |
| 3,527,653 | 9/1970 | Sommer et al. | 117/62.2 |
| 3,555,129 | 1/1971 | Fukada et al. | 264/41 |

OTHER PUBLICATIONS

Hackh's Chemical Dictionary, 3rd Edition, McGraw-Hill, N.Y. (1944) pages 298, 786-7, 923, 696. Call No. QD5H3.
Condensed Chemical Dictionary, 5th Edition, Reinhold, N.Y. (1956) pages 866-867. Call No. QD5C5.
Kittila, Dimethyl Formamide DuPont, Wilmington (Del.) 1967, pages 225-226.
Handbook of Chemistry and Physics 39th Edition Chemical Rubber Publ. Co. Cleveland (1958) pages 604-5, 1713, 484-5, 1696.

*Primary Examiner*—Hosea E. Taylor
*Assistant Examiner*—H. S. Cockeram
*Attorney*—Clelle W. Upchurch and Robert A. Gerlach

[57] ABSTRACT

Microporous sheet structures having increased permeability to water vapor are prepared by coagulating a solution of a polyurethane by washing out the solvent of the solution with a nonsolvent, the coagulation being conducted in the presence of an electrolyte.

3 Claims, No Drawings

PROCESS FOR PREPARING MICROPOROUS FOILS FROM POLYURETHANES CONTAINING HYDRATED ELECTROLYTES

This invention relates to microporous foils and particularly to a method of producing microporous foils having increased permeability to water vapor.

It has been heretofore known to produce porous solid materials by incorporating fillers, in a finely divided form, into the solid material and then removing the filler after the solid material has been shaped. Pores are thus produced in the solid material. This method is employed, for example, in the production of partitions for use in batteries. A process is known in which solid sodium or calcium chloride is incorporated in polymer solutions, (e.g., in solutions of polyurethane in dimethylformamide) which are then coagulated after the shaping process while at the same time the salt is dissolved out. This process has no advantages over the usual methods of producing microporous polyurethane foils, such as those described in German Pat. No. 1,110,607, as it results in nonuniform products with large pores.

It is an object of this invention to provide improved microporous sheet structures. It is another object of this invention to provide microporous sheet structures having increased permeability to water vapor. It is a further object of this invention to provide an improved process of making microporous sheet structures.

The foregoing objects and others which will become apparent from the following description are accomplished in accordance with the invention, generally speaking, by providing fine textured microporous sheet structures having an increased permeability to water vapor by coagulating a solution of a polyurethane, prepared by the isocyanate polyaddition process and dissolved in a highly polar solvent (e.g., dimethylformamide or dimethylacetamide) by washing out the solvent with a nonsolvent, the coagulation being carried out in the presence of 10 to 1,500 percent, (based on the polyurethanes), of either a solid, finely divided electrolyte which contains water of crystallization or of an electrolyte which is added in the presence of water. These latter electrolytes must have either an enthalpy of hydration of less than 18 Kcal./mol and a solubility of less than 150 g. per 100 g. of dimethylformamide or dimethylacetamide or an enthalpy of hydration of more than 18 Kcal./mol and a solubility of less than 15 g. per 100 g. of dimethylformamide or dimethylacetamide.

Any highly polar solvent for the polyurethane may be used. Such solvents are the same as used for preparing the polyurethane from a prepolymer and a chain lengthening agent as defined below. They are preferably solvents which are capable of forming strong hydrogen bonds and more especially amide- or sulphoxide-containing solvents. Preferred are dimethylformamide, dimethylacetamide and dimethylsulphoxide. Other examples are: formylmorpholine, hexamethylphosphoramide, dimethylcyanamide, diethylformamide and mixtures of these solvents.

The addition of such electrolytes makes the microporous films easier to work up because these electrolytes give up their water of crystallization to the dimethylformamide or dimethylacetamide in locally defined regions, thus reducing the dissolving power of the solvent and performing a gel-type structure of the polymer, so conversion into a microporous sheet structure is facilitated. When the electrolyte is added in aqueous solution, an equilibrium is established between the water, the organic solvent and the electrolyte, which has a similar effect.

The electrolyte can be added to the polyurethane solution or to the "nonsolvent" during or after coagulation.

Accordingly the invention avoids the uneconomical procedure of gelling the polyurethane solution by contact with moist air, as described in German Pat. No. 1,110,607. Thus the addition of electrolytes which contain water of crystallization enables the process to be carried out rapidly without the need for special selection of polyurethanes or the use of other additives or special procedures. In addition, the microporous structure produced is improved. The addition of electrolytes also improves the properties of the resulting foils, e.g., in their resistance to hydrolysis and their modulus.

Any film-forming polyurethane or polyurethane urea having a molecular weight of at least 10,000 and soluble in organic, preferably highly polar organic solvents such as dimethylformamide, dimethylsulphoxide or dimethylacetamide, are suitable for the process according to the invention.

Polyurethane ureas in this context include film-forming elastomeric polyurethane "ureas" which in addition to urethane bonds also contain the groups R'—NH·CO·NH—, which may also occur in the following:

—R'—NH·CO·NH—R—
—R'—NH·CO·NH—NH·CO—R—
—R'—NH·CO·NH—NH·CO·$^{NH}$—R—
—R'—NH·CO·NH—NH·CO·O—R—

—R'—NH.CO.NH.N—R—
　　　　　　　　|
　　　　　　　Alkyl

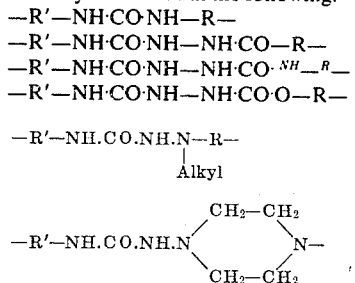

—R'—NH·CO·NH·NH·CO·NH·R'—
—R'—NH·CO·NH·NH·CO·NH·NH·CO·NH—R'—
—R'—NH·CO·NH·NH·CO·CO·NH·NH·CO·NH—R'— in which R' denotes the divalent radical of an organic diisocyanate and the radical R also denotes a divalent organic radical. These polyurethane ureas are preferably only soluble in highly polar solvents such as dimethylformamide.

Such "urea" groups are formed, for example, when diisocyanates which may be of high molecular weight are reacted with bifunctional chain lengthening agents in which the hydrogen atoms which will react with isocyanates are linked to nitrogen atoms, e.g., primary di-amines, hydrazine, carbohydrazide, di-hydrazines, (di)-hydrazides, (di)-semicarbazides or (di)-carbazic esters. The urea groups —R'—NH·CO·NH—R'— are also formed when water is used as a bifunctional chain lengthening agent.

The elastomeric polyurethanes and polyurethane ureas for use according to the invention can be produced by known processes. High molecular weight, substantially linear polyhydroxyl compounds, which carry terminal hydroxyl groups, and have a molecular weight between 500 and 5,000 and, if desired, other low molecular weight dihydric alcohols are first reacted with excess diisocyanate to form a prepolymer which has terminal isocyanate groups, and this prepolymer is then reacted with water or with compounds which are bifunctional under the chosen reaction conditions and in which the hydrogen atoms which will react with isocyanates are linked to oxygen and/or nitrogen atoms. In cases where diols are reacted with higher molecular weight diisocyanates, this chain lengthening reaction is preferably carried out in a melt or in inert solvents such as tetrahydrofuran or dioxane. Higher molecular weight dihydroxy compounds and diol mixtures can also be converted directly into the polyurethane in a melt or in inert solvents. The substantially higher reactivity of diols and hence the greater speed of the chain lengthening reaction, makes it desirable to carry out the reaction in highly polar, water-soluble solvents with a boiling point above 100° C. when less reactive NH containing chain lengthening agents are used.

The preparation of such polyurethane urea solutions is described, e.g., in German Patent specification Nos. 888,766; 1,123,467; 1,150,517; 1,154,937; German Pat. Nos. 1,161,007; 1,183,196 in 1,186,618, Belgian Patent specification Nos. 649,619; 646,637; 658,363; 644,344; 664,346 and 666,208, French Patent specification Nos. 1,360,082; 371,391 and 1,383,077 and in United States Patent specification Nos. 2,929,803; 2,929,804 and 3,040,003.

Higher molecular weight, substantially linear polyhydroxyl compounds with terminal hydroxyl groups which are suitable are, for example, polyesters, polyester amides, polyethers, polyacetates, polycarbonates and poly-N-alkyl-urethanes or mixtures of these which may also contain ester, ether, amide, urethane or N-alkylurethane groups and which have molecular weights between 500 and 5,000 and melting points advantageously below about 60° C. and preferably below 45° C.

Specially preferred compounds are the polyesters of adipic acid with dialcohols or with mixtures of dialcohols such as ethylene glycol, propylene glycol, butane-1,4-diol, hexane-2,5-diol, 2,2-dimethyl-propane-1,3-diol, hexane-1,6-diol, 2-methylhexane-1,6-diol, 2,2-dimethylhexane-1,3-diol, p-bis-hydroxymethyl-cyclohexane, 3-methyl-pentane-1,4-diol and 2,2-diethyl-propane-1,3-diol. Other acids such as succinic acid, oxalic acid, methyl adipic acid, glutaric acid, maleic acid and the like may be used. Those polyesters which are obtained from diols, or mixtures of diols, and which contain five or more carbon atoms are particularly suitable because such polyesters have a relatively high resistance to hydrolysis and moreover the corresponding end products have good elasticity at low temperatures, especially when diols with alkyl radicals in the side chains have been included. Polyesters within a narrow molecular weight range which are obtained by polymerization of caprolactone and diethylene glycol are also very suitable as starting materials.

Polyurethanes and polyurethane ureas with an excellent resistance to hydrolysis can be obtained from polyalkylene ethers, such as polytrimethylene ether diols and polypropylene glycols, especially from polytetramethylene ether diols which may also be used as copolyethers (by condensation with small quantities of epoxides such as propylene oxide or epichlorohydrin) or after end group modification, e.g., replacement of the OH groups by the group —O—CO·N(alkyl)·CH$_2$·CH$_2$·OH. Polyepichlorohydrins which come within the given range of molecular weights and carrying terminal OH groups are also suitable for producing flameproof products.

Surprisingly, the process according to the invention can also be carried out with polyhydroxyl compounds which are miscible with water, such as polyethylene ether diols, in which case polyurethanes with a high water uptake capacity are obtained.

Any suitable diisocyanate or mixture of diisocyanates may be used, such as, for example, aliphatic, cycloaliphatic, aralphatic, aromatic and heterocyclic diisocyanates and the like. Especially suitable are diisocyanates with a symmetrical structure, e.g., diphenylmethane-4,4'—diisocyanate; diphenyl-diemthylmethane-4,4'-diisocyanate; phenylene-1,4-diisocyanate; 2,2'6,6'-tetramethyl-diphenylmethane-4,4'-diisocyanate, diphenyl-4,4'-diisocyanate, diphenylether-4,4'-diisocyanate or their alkyl, alkoxy or halogen substituted derivatives and the like; other aromatic diisocyanates such as, toluylene-2,4- and -2,6-diisocyanate or the commercially available mixtures of these; 2,4-diisopropylphenylene-1,3-diisocyanate; m-xylylene diisocyanate; p-xylylene-diisocyanate and ααα', α'-tetramethyl-p-xylylene-diisocyanate; and also alkyl- or halogen-substituted products of the above diisocyanates, e.g., 2,5-dichloro-p-xylylene-diisocyanate or tetrachloro-p-phenylene-diisocyanate; dimeric toluylene-2,4-diisocyanate; bis-3-methyl-4-isocyanatophenyl-urea or naphthalene-1,5-diisocyanate and the like; aliphatic diisocyanates such as hexane-1,6-diisocyanate; cyclohexane-1,4-diisocyanate; dicyclohexylmethane-4,4'-diisocyanate; 1-isocyanato-3-isocyanatomethyl-3,5,5-trimethylcyclohexane or 2,2,4-trimethylhexane-1,6-diisocyanate can also be used in some cases and yield products which suffer very little discoloration on exposure to light. Diisocyanates such as ωω'-di-(isocyanatoethyl)-benzene or 1,2,3,4,5,6-hexahydrodiphenylmethane-4,4'-diisocyanate also yield products which suffer little discoloration on exposure to light.

Owing to their commercial availability and their overall properties, diphenylmethane-4,4'-isocyanate, the isomeric toluylene diisocyanates and if desired also a certain proportion of hexane-1,6-diisocyanate and dicyclohexylmethane-4,4'-diisocyanate are used for preference.

The higher molecular weight polyhydroxy compounds are reacted with the diisocyanates in a molar ratio of about 1:1.25 to 1:4.0, if desired in several stages in a melt or in solvents which are inert to isocyanates, e.g., tetrahydrofuran, dioxane or chlorobenzene, at temperatures of about 130+ C., preferably 70° to 100° C. The reaction times used are such that a substantially linear preadduct containing terminal NCO groups is obtained, which when reacted with approximately equivalent quantities of bifunctional chain lengthening agents will yield a substantially linear elastomeric polyurethane, which is soluble in highly polar solvents such as dimethylformamide, or a soluble elastomeric polyurethane urea.

If the polyhydroxyl compound has a low molecular weight, e.g., 750–1,250, the reaction with diisocyanates is preferably carried out at low NCO/OH ratios, e.g., 2.0:1 to 1.25:1, whereas in the case of high molecular weights, e.g., 1,700 to 2,500, high NCO/OH ratios, e.g., 3:1 to 1.65:1 are preferably employed.

In addition to the higher molecular weight polyhydroxyl compounds, low molecular weight diols (molecular weight preferably below 250), e.g., ethylene glycol, butane-1,4-diol, bis-N,N-(β-hydroxyethyl)-methylamine, bis-N,N-(β-hydroxypropyl)-methylamine, N,N'-bis-hydroxyethyl-piperazine or hydroquinone-bis-(β-hydroxyethylether) may be used in quantities of, for example 10 to 300 mols percent of the OH content, preferably 20 to 100 mols percent of the higher molecular weight polyhydroxyl compound. The use of diols of tertiary nitrogen compounds, in particular, increases the dyeability, improves the light fastness of the product and provides a starting point for further aftertreatments such as cross-linking, e.g., with compounds with a powerful alkylating effect, e.g., 4,4'-dichloromethyl diphenylether.

The NCO content of the preadducts (based on the solvent-free adduct) influences considerably the properties of the resulting polyurethanes. It should be at least 0.50 percent by weight and should preferably be between about 1 and about 7.6 percent by weight, but especially between about 1.5 and 4 percent by weight in order to insure that the polyurethanes will have sufficiently high melting points, tensile strengths, elongations at break and tension values. In cases where the chain lengthening reaction is carried out with water, the NCO content is preferably rather higher, e.g., between 3.5 and 7.6 percent by weight, since some of the NCO groups are first saponified into amino groups. The chain lengthening agents should have a molecular weight of 18 to about 500, preferably 32 to 350. Apart from water, the following are examples of suitable chain lengthening agents which may be employed (if desired as mixtures): ethylene glycol, propylene glycol, butane-1,4-diol, hexane-1,6-diol, hydroquinone-bis-(β-hydroxyethylether), p-xylylene glycol, ethylene diamine, 1,2- and 1,3-propylene diamine, 1,4-tetramethylenediamine, 1,6-hexamethylenediamine, 2,2,4-trimethylhexane-1,6-diamine, 1-methyl-cyclohexane-2,4-diamine, 1-amino-3-aminomethyl-3,5,5-trimethyl-cyclohexane, 4,4'-diamino-dicyclohexyl-methane, bis-(aminopropyl)-piperazine or aromatic diprimary amines such as 4,4'-diaminodiphenylmethane, 4,4'-diaminodiphenylsulphide, 4,4'-diamino-diphenylether, 1-methyl-2,4-diamino-benzene or aralphatic diprimary diamines such as m-xylylene diamine, p-xylylene diamine, ααα', α'-tetramethyl-p-xylylene diamine, 1,3-bis-(β-aminoisopropyl)-benzene, diamines which contain sulphonic acid groups, such as 4,4'-diamino-stilbene-2,2'-disulphonic acid or 4,4'-diaminodiphenylethane-2,2'-disulphonic acid, ethylene diamine-N-butylsulphonic acid, hexamethylene-diamine-1,6-N-butylsulphonic acid, 1,6-diamino-hexamethylene-3-sulphonic acid or their alkali metal salts, hydrazides such as carbodihydrazide, oxalic acid dihydrazide, malonic acid dihydrazide, succinic acid dihydrazide and hydracrylic acid dihydrazide, p-phenylene diacetic acid dihydrazide, hydroquinone-diacetic acid dihydrazide, N-methyl-bis-(propionic acid hydrazide), N,N-piperazide-bis-(propionic acid hydrazide), isophthalic acid dihydrazide, tetraphthalic acid dihydrazide, m- and p-cyclohexane dicarboxylic acid hydrazide (cis/trans), hexamethylene-bis-semicarbazide, butanol-bisicarbazic ester, aminoacetic acid hydrazide and hydrazine, e.g., also in the form of hydrazine hydrate as well as dihydrazines such as N,N'-diamino-piperazine.

Secondary diamines, preferably those with a symmetrical structure such as piperazine or 2,5-dimethylpiperazine can also be used (but preferably in quantities of less than 30 mols percent).

Monofunctional compounds such as butylamine, butyl semicarbazide or N,N'-dimethylhydrazine may also be used in small quantities, e.g., 0.1 to 10 mols percent (based on NCO content) to reduce the molecular weight and to obtain polyurethane elastomers which are still soluble in spite of some molecular branching.

The preferred chain lengthening agents to be used are ethylene diamine, m-xylylene diamine, hydrazine, carbodihydrazide, oxalic or malonic acid dihydrazide, aminoacetic acid hydrazide and water, and these should account for at least 50 mols percent and preferably more than 80 mols percent of the total amount of chain lengthening agent used. If mixtures of chain lengthening agents are used, the solubility of the polyurethane ureas usually increases the melting point of the elastomers produced drops.

The reaction with chain lengthening agents is preferably carried out in the melt in cases where diols are used or in highly polar, water-soluble solvents boiling above 100° C., in cases where NH-functional chain lengthening agents are used. Examples of amide- or sulphoxide-containing solvents capable of forming strong hydrogen bonds and suitable for use in the process of the invention are, for example, dimethylformamide, diethylformamide, dimethylacetamide, formylmorpholine, hexamethylphosphoramide, dimethylsulphoxide, dimethylcyanamide and mixtures thereof. The preferred solvent for the industrial process is dimethylformamide. Less highly polar solvents which are not themselves able to dissolve the polyurethanes or polyurethane ureas, e.g., tetrahydrofuran, dioxane, acetone or glycol monomethyl ether acetate, can be added to the highly polar solvents in amounts of up to about 33 percent by weight of the total quantity of solvent. The concentration of the elastomer solutions should preferably be about 5 to 43 percent by weight, particularly 15 to 27 percent by weight, and the viscosities should preferably be between 1 and 1,000 poises, especially between 50 and 800 poises/20° C.

NH-functional chain lengthening agents generally react very rapidly with the preadducts to form the polyurethane ureas, so that the chain lengthening reaction is usually carried out at temperatures below 100° C., either continuously or in batches, e.g., in the case of relatively sparingly soluble dihydrazide compounds it is carried out at about 50° to 70° C. Room temperature is in most cases suitable and in the cases where the very highly reactive aliphatic diamines or hydrazine are used cooling may sometimes be needed, e.g., to −10° C. Preferably such diamines or free hydrazine are not employed but instead, suspensions of the corresponding carbazic acids or amino carbonates obtained from them by the addition of $CO_2$ (according to German Pat. Nos. 1,222,253 and 1,223,154), permits the reaction to be carried out safely at room temperature or even at elevated temperatures of up to 65° C.

The reaction of the prepolymers is carried out with approximately equivalent or excess quantities (e.g., 1 to 20 mols percent excess) of the chain lengthening agents. The larger the excess of chain lengthening agents used, the lower will be the molecular weight of the polyurethane or polyurethane urea produced. By careful addition of other, preferably less reactive aliphatic di- or triisocyanates, the molecular weight or solution viscosity can be adjusted to the desired values (according to German Patent specification No. 1,157,386). When the desired viscosity has been reached, the end groups may be stabilized by reaction with monoisocyanates such as butyl isocyanate, or with anhydrides or other acylating agents such as acid chlorides or carbamic acid chlorides.

Organic or inorganic pigments, dyes, optical brightening agents, ultraviolet absorbents, phenolic antioxidants, special light-protective agents such as N,N-dialkylsemicarbazides or N,N-dialkylhydrazides and substances that with a cross-linking action, such as para-formaldehyde, melamine hexamethylolether or other formaldehyde derivatives such as dimethylol-dihydroxyethylene urea, dimethylolethylene urea, trimethylolmelamine, dimethylolurea-dimethylether, quaternizing agents such as dichloromethyl-durene or polyaziridine ureas, e.g., hexamethylene-ωω-bis-ethyleneimide-urea may be added to the solutions of polyurethanes or polyurethane ureas. The resistance to dissolution and swelling by highly polar solvents is modified by a cross-linking reaction which may, for example, be thermally initiated. Owing to the fact that these compounds are built up of "soft segments" (polyhydroxyl compound) and "hard segments" (the portions of the molecule that may be considered as built up from diisocyanates and NH chain lengthening agents or water), the polyurethane urea elastomers to be used according to the invention have the properties normally associated with "cross-linked" elastomers despite their linear structure. This "cross-linking" is typically effected by the powerful hydrogen bonds within the urethane segments and especially in the "urea segments.".

The mechanical and elastic properties of the products can be determined on films of these polyurethane or polyurethane solutions produced by drying on glass plates at 100° C., for example, after the films have been cut up into strips or filaments. Solutions especially suitable for the purpose according to the invention are those which yield films that have the following properties:

1. Melting point as measured on a Kofler block of at least 150° C., preferably above 200° C.,
2. tensile strengths of at least about 100 kg./cm.$^2$, preferably above 200 kg./cm.$^2$,
3. elongations at break of at least 200 percent, preferably 400 to 800 percent,
4. tensile strength of at least 1 kg./cm.$^2$ on the first stretching to 20 percent, preferably 5 to 30 kg./cm.$^2$; at least 5 kg./cm.$^2$ and preferably 20 to 75 kg./cm.$^2$ on stretching to 100 percent,
5. a molecular weight such that the inherent viscosity $\eta=(\ln \eta R/C) \geq 0.5$, preferably 0.70 to 1.9, when 1.0 g. of elastomer at 20° C. has been dissolved in 100 ml. of hexamethylphosphoramide (phosphoric acid tris-dimethylamide) at 20° C. In the above formula, $\eta R$ is the relative viscosity and C the concentration in g./100 ml.
6. in addition, these polyurethanes should preferably no longer be soluble in slightly polar solvents e.g., tetrahydrofuran, dioxane or glycol monomethylether acetate (without degradation) used alone, but only in highly polar solvents, e.g., dimethylformamide.

According to the invention, electrolytes such as aluminum sulphate octadecahydrate, barium chloride dihydrate, calcium nitrate tetrahydrate, cobalt-II-nitrate hexahydrate, chromium-III-acetate hydrate, chromium-II-sulphate heptahydrate, chromium-III-sulphate pentadecahydrate, copper-II-sulphate pentahydrate, iron-II-sulphate heptahydrate, iron-III-sulphate nonahydrate, iron-III-phosphate tetrahydrate, potassium-aluminium sulphate dodecahydrate, iron-II-ammonium sulphate hexahydrate, chromium-III-potassium sulphate dodecahydrate, sodium acetate trihydrate and disodium hydrogen phosphate dihydrate are suitable. These electrolytes can also be added to the polyurethane solution in the anhydrous form dissolved in a solvent together with the appropriate quantity of water.

The physical data of such compounds are summarized in Table 1.

Compounds which contain chemically bound water or which are capable of reacting with water according to the following equation $$MeOx + xH_2O \rightarrow Me(OH)_x$$

may also be used.

Examples of such compounds are zinc oxide, lead oxide,

TABLE I

| Salt | Molecular weight | d | Solubility in $H_2O$ (g./l.) | Solubility in DMF (g./l.) | Solubility in DMF (g./100 g.) | Percent by weight water of crystallization | Hydration enthalpy (Kcal./mol) |
|---|---|---|---|---|---|---|---|
| $Al_2(SO_4)_3 \cdot 18H_2O$ | 666.4 | 1.69[17] | 363 | 100.6 | 10.6 | 48.4 | 8.1 |
| $BaCl_2 \cdot 2H_2O$ | 244.3 | 3.097 | 357[20] | 7.68 | 0.81 | 14.7 | 8 |
| $BaO$ | 153.36 | 5.7 | 34.8 | 2.5 | 0.26 | | 17–22 |
| $BaSCN \cdot 2H_2O$ | 289.56 | | 430[20] | 119.7 | 12.5 | 12.5 | ca. 9 |
| $CaO$ | 56.08 | 3.346 | 1.3[10] | 3.1 | 0.33 | | 15.1 |
| $Co(NO_3)_2 \cdot 6H_2O$ | 291.05 | 1.87 | 1,338 | 154 | 16.3 | 37.2 | 8.2 |
| $Cr(CH_3COO)_3 \cdot H_2O$ | 247.16 | | Low | 2.6 | 0.27 | 7.3 | ~18 |
| $Cr_2O_3$ | 152.02 | 5.21 | Insoluble | 3.7 | 0.39 | | ~10 |
| $Cr_2(SO_4)_3 \cdot H_2O$ | | | Low | 5 | 0.53 | | ~18 |
| $CuO$ | 79.5 | 6.4 | Insoluble | 7.4 | 0.78 | | ~3 |
| $CuSO_4 \cdot 5H_2O$ | 249.7 | 2.28 | 209 | Low | Low | 36.1 | 18.55 |
| $FeSO_4 \cdot 7H_2O$ | 278 | 1.898 | 156 | 32.2 | 3.4 | 45.4 | ~14 |
| $FePO_4 \cdot 4H_2O$ | 223 | | Low | 2.36 | 0.25 | 32.3 | ~10 |
| $KAl(SO_4)_2 \cdot 12H_2O$ | 474.39 | 1.75 | 114[20] | 12.6 | 1.34 | 45.7 | ~9 |
| $MgO$ | | | Insoluble | 46.6 | 4.8 | | 5.4 |
| $MgCl_2 \cdot 6H_2O$ | 203.33 | 1.56 | 1,670 | 72.2 | 7.6 | 53.3 | 32.97 |
| $(NH_4)_2Fe(SO_4)_2 \cdot 6H_2O$ | 392.16 | 1.864 | 269[20] | 3.7 | 0.39 | 27.6 | ~10 |
| $NH_4Fe(SO_4)_2 12H_2O$ | 482.2 | 1.71 | 1,240[25] | Low | Low | 44.8 | ~16 |
| $NaCH_3COO \cdot 3H_2O$ | 136.09 | 1.45 | 762 | ca. 100 | 10.5 | 26.4 | 8.7 |
| $Na_2HPO_4 \cdot 2H_2O$ | 178.01 | 2.066[15] | 1,000[50] | 11.04 | 1.16 | 20.2 | 6.03 |
| $NiCl_2 \cdot 6H_2O$ | 237.7 | 553 | 2,540[20] | 37.5 | 4.0 | 45.5 | 18 |
| $ZnO$ | 81.4 | 5.47 | 0.0002 | Insoluble | | | 2.75 | magnesium oxide, copper oxide, chromium oxide, calcium oxide, barium oxide and iron oxides. As a rule, however, only those oxides are used which in aqueous solution or suspension do not exhibit too high an alkalinity (i.e., pH<9). Examples of electrolytes which can be used for the invention are listed in Table 1 (literature: Gmelin, Landolt-Bornstein II (1923), pp. 1,570 and 1,408, second supplementary volume, part 2 (1931) p. 1,586.

The electrolytes used according to the invention are generally added to the solution in solid form in quantities of 2 to 1,500 percent, preferably 10 to 1,000 percent and especially 30 to 300 percent (based on dissolved polyurethane).

In addition, the electrolyte can also be added in solution in e.g., dimethylformamide, dimethylacetamide, water, alcohols or acetonitrile, to the polyurethane solution in such amounts that the polyurethane is not precipitated. The amount of electrolyte solution which will precipitate the polyurethane from solution is best determined by a preliminary test, and less than 95 percent of this amount should be used in the actual experiment. In one particular procedure, the electrolyte solution is added to a hot polyurethane solution because much more electrolyte solution can be introduced into a polyurethane solution at elevated temperatures without causing precipitation of the polyurethane. If this is done, however, the support to which the solution is later applied should be warmed or raised to the same, or a slightly higher, temperature than that of the polyurethane solution. This insures that when the solution is poured on to the support the polyurethane will not be precipitated from the solution.

More than 1,500 percent of electrolyte based on the amount of polyurethane can be used, but smaller amounts will generally be employed because sheets produced using such high quantities of electrolyte have a very high permeability to water vapor and therefore are not generally considered to be of good quality. If the tensile strength (kg. wt./cm.$^2$) or the tear propagation resistance (kg. wt./cm.) of the sheets is plotted against the permeability of water vapor (mg./h./cm.$^2$), hyperbolae are usually obtained which demonstrate the rapid drop in quality.

Electrolytes which are only sparingly soluble in the solvents used for the polyurethanes are best added to the polyurethane solution in solution in some other solvent, preferably a solvent or swelling agent for the polyurethane.

If, however, such electrolytes or electrolytes which are soluble in dimethylformamide or dimethylacetamide are to be added to the polyurethane solution in solid form, the particle size is best less than 1 mm. and in particular less than 0.25 mm.

The amount of water of crystallization contained in the electrolyte, the enthalpy of hydration or dissociation pressure of the hydrate, its solubility in the polyurethane solvent and the particle size will all influence the suitability of the electrolyte in question for use in the process according to the invention. The enthalpy of hydration is a measure of the ease with which the water of hydration of the electrolyte is given up. Electrolytes which contain relatively little water of crystallization and having a low enthalpy of hydration can easily be added in fairly high concentrations to a polyurethane solution. Electrolytes which contain a large amount of water of crystallization can only be introduced in large quantities into a polyurethane solution either if they have a low enthalpy of hydration or are difficultly soluble in the polyurethane solvent or are in the form of coarse particles. The reason why the particle size should so influence the coagulability is that it controls the speed with which the electrolyte dissolves in the polymer solvent. The smaller the particle size of the electrolyte, the greater will be its total surface area and hence the rate of solution (see Table 3). Thus, for example more than 300 percent of aluminum sulphate octadecahydrate of a particle size of 0.1 to 0.25 mm. can be introduced into a polyurethane solution without coagulation, whereas 300 percent of the same electrolyte but with a particle size of less than 0.1 mm. will precipitate the polyurethane from the solution.

The concentration of the polyurethane in the solution is of minor importance if the same percentage of electrolyte in the dissolved polymer is used.

Suitable electrolytes for use according to the invention are normally water-soluble compounds, but electrolytes which are sparingly soluble in water, e.g., iron phosphate, can also be used; if these subsequently have to be removed from the finished microporous sheet structure, they can be washed out using a strong complex-forming agent, such as an aqueous solution of ethylene diamine tetracetic acid or some other suitable solvent.

The addition of electrolytes which contain water of crystallization to the polyurethane solutions causes a reduction in the solubility of the polyurethane in the solvent, which reduction may be localized, and hence preformation of the polyurethanes subsequent microporous structure.

As is well known, most of the electrolytes mentioned, especially those of elements belonging to the subgroups of the Periodic Table, are capable of forming complex compounds with —CO—NH— groups. Thus, for example it has been described how chromium compounds form subsidiary valency bonds with the peptide groups of the protein in skin in the process of tanning (see Ullmanns Enzyklopadie der technischen Chemie, third Edition, Volume II, Munich 1959, p. 605). This complex bond probably in most cases improves the tensile elongation and resistance to hydrolysis of the sheet products.

Nonsolvents for the polyurethane (e.g., water) can also be added to the electrolyte-containing polyurethane solution up to amounts at which a slightly cloudy, colloidal polymer dispersion is formed.

In addition to the electrolytes, dyes, fillers, other polymers (such as polyvinyl chloride, polyvinyl acetate, polyvinyl alcohols, acylated cellulose derivatives, ABS polymers and acrylates) and formaldehyde splitters such as paraformaldehyde or methylol derivatives of methylol ether derivatives such as dimethylolurea, adipic acid dimethylolether diamide and melamine hexane methylolhexanemethyl ether as cross-linking agents can also be added to the polyurethane or polyurethaneurea solution.

The polyurethane or polyurethane urea solution to which the electrolytes have been added and which may also contain other additives is applied by the usual methods (e.g., spraying, application with wiper, rollers, casting or painting) to permeable or impermeable substrates. Examples of permeable substrates are fleeces, woven and knitted textiles, split leather, grain leather or fiber leather. Examples of impermeable substrates are glass plates, metal matrices, silicone rubber matrices and silicone-treated stripping papers.

After the polymer solution has been shaped it is then dipped into a "nonsolvent" for the polymer. Suitable "nonsolvent," which should preferably be miscible with the solvent, are water, methanol, ethanol, propanol, butanol, hexanol, ethers such as di-n-butyl ether and di-n-propylether, mineral oil and oil of turpentine. Suitable "nonsolvents" are especially solvents in which a sample of the polymer film will not swell by more than 50 percent by weight, in the course of 24 hours at the temperature at which the process is carried out (normally room temperature). The film is then washed with the "nonsolvent" until the solvent is removed. If desired, the electrolyte may be washed out at the same time or afterwards. According to a particular procedure, the temperature of the washing solution is gradually raised to 60°–95° C. after a washing time of about 10 to 20 minutes, and the film, which has by this time noticeably solidified, is subjected to a more intensive washing, e.g., by stretching and releasing it, e.g., with the aid of rollers rotating at different speeds.

In one variation of the process described above, which can be used especially for polyurethanes which have been chain lengthened with hydrazine, hydrazides or semicarbazides, i.e., with polyurethanes which contain —NH—CO—NH—NH—CO—NH, —NH—CO—NH—NH—CO—NH—NH—CO—NH— or —NH—CO—NH—NH—CO—R—CO—NH—NH—CO—NH— groups, the electrolyte can be added to the washing solution. After the film has been dipped into this washing solution, the hydrated electrolyte ions diffuse into the polyurethane, causing localized gelling of the polyurethane and, as a result of complex formation, the properties of the microporous sheet structures which can subsequently be obtained from the polyurethane exhibit the same improvements obtained according to the invention.

If the microporous sheets obtained by washing out the solvent are applied to porous supports, they can be finished by the usual methods employed for leather or artificial leather. If nonporous supports are used, the dry sheet product is best glued on to porous substrates by means of discontinuous layers of adhesive according to the rules of the known reversal process, and these can then be finished in the usual way.

The invention is further illustrated by the following examples in which the parts are by weight unless otherwise specified.

Method of Preparation A 1

About 13,000 parts of a copolyester of adipic acid and hexane-1,6-diol and 2,2-dimethylpropane-1,3-diol (molar ratio of glycol mixture 65:35) of OH number 63.78 which have been dewatered for about 1 hour at about 130° C. and 12 mm. Hg are heated together with about 3,168 parts of diphenylmethane-4,4'-diisocyanate (molar ratio polyester/diisocyanate = 1:1.75) to a temperature of 96° to 98° C., with stirring, and then kept at this temperature for about 70 minutes. About 15,000 parts of the hot molten NCO preadduct are then introduced into a solution, at about 60° C., containing about 442 parts of carbohydrazide in about 43,358 parts of dimethylformamide, a homogeneous elastomer solution having a viscosity of 220 poises is formed. The viscosity rises to 280 poises/20° C. after addition of about 5.06 parts of hexane-1,6-diisocyanate. The $\eta_i$ value of a 1.0 percent by weight solution of the elastomer substance in hexamethylphosphoramide is 0.97 at 20° C.

Method of Preparation A 2

About 1,200 parts of a copolyester of adipic acid, ethylene glycol and butane-1,4-diol (molar ratio of glycols 1:1) of OH number 56.3 are converted into an NCO preadduct melt (3.24 percent NCO) with about 302 parts of diphenylmethane-4,4'-diisocyanate by heating to 95° to 98° C. for about 30 minutes.

About 400 parts of the NCO preadduct melt are introduced with intensive stirring, at room temperature, into a suspension of the amino carbonates prepared by putting about 40 parts of solid carbon dioxide into a solution of about 22.60 parts of m-xylene diamine into about 1,268 parts of dimethylformamide, $CO_2$ is liberated from the amino carbonates and a highly viscous homogeneous elastomer solution is formed which is then diluted to a viscosity of 540 poises/20° C. with 150 parts of dimethylformamide.

Method of Preparation A 3

About 430 parts of the NCO preadduct melt from Example A 2 which has been heated for a further 130 minutes at about 96° C., by which time its NCO content is 3.05 percent, are mixed with a solution of about 30.9 parts of 4,4'-diaminodiphenylmethane in about 1,460 parts of dimethylformamide. The viscosity of the brownish-colored solution rises to 560 poises/20°B C. in the course of several hours.

Method of Preparation A 4

About 800 parts of a copolymer ester of adipic acid, hexane-1,6-diol and 2,2-dimethylpropane-1,3-diol (glycol mixture in the molar ratio of 65:35) (OH number 67.75) are heated to about 98° C. for about 200 minutes with about 160 parts of hexane-1,6-diisocyanate (molar ratio 1:2.0). About 637 parts of the NCO preadduct melt (4.0 percent NCO) are then mixed with a solution of about 27.38 parts of carbohydrazide in about 1,883 parts of dimethylacetamide, the viscosity slowly rises to 103 poises/20° C. Elastomer films which are obtained from the solution by evaporation of the solvent at about 100° C., have excellent resistance to yellowing and mechanical degradation on exposure to light.

Method of Preparation A 5

About 6,500 parts of polyester described in A 1 are slowly heated to about 95° C. together with about 127.5 parts of N,N-bis-(β-hydroxypropyl)-N-methylamine and about 1,786 parts of diphenyl methane-4,4'-diisocyanate for about 50 minutes. The NCO content 1.92 percent.

About 7,365 parts of the preadduct melt are vigorously stirred into a diaminocarbonate suspension prepared by the addition of about 250 parts of solid carbon dioxide to a solution of about 118.5 parts of ethylene diamine and about 16.3 parts of propylene-1,2-diamine in about 21,365 parts of dimethylformamide at room temperature, a highly viscous elastomer solution (770 poises) is formed within a few minutes, with evolution of $CO_2$. 1.5 percent by weight of the pentaerythritol ester of 3,5-ditertiary-butyl-4-hydroxy-phenyl-γ-propionic acid is added to the solution as an antioxidant.

Method of Preparation A 6

About 1,500 parts of the polyester described in A 1 and about 294 parts of toluylene diisocyanate (isomeric mixture of 80 percent 2,4- and 20 percent 2,6-diisocyanato-toluene) in the molar ratio of 1:1.90 are heated at about 96° C. for about 130 minutes to form the NCO preadduct (2.6 percent NCO). About 376.5 parts of the NCO preadduct are then stirred into a solution of about 14.8 parts of carbodihydrazide in about 1,140 parts of dimethylformamide to form a viscous elastomer solution (562 poises).

Method of Preparation A 7

About 800 parts of the copolyester described in A 1 and about 162.5 parts of diphenylmethane-4,4'-diisocyanate are heated to about 98° C. for about 30 minutes, a highly viscous NCO preadduct is formed which is then diluted with about 240 parts of anhydrous dioxane and heated for a further 20 minutes at about 98° C. After cooling, the NCO content of the solution is 1.018 percent (the NCO-content of the solvent-free NCO adduct is calculated from this to be 1.27 percent).

About 727 parts of this NCO preadduct solution are added to a solution of about 8.22 parts of carbohydrazide in about 1,532 parts of dimethylformamide with intensive mixing, a homogeneous, clear elastomer solution which has a viscosity of 271 poises/20° C. and 26 percent solids concentration is obtained.

Method of Preparation A 8

About 1,200 parts of a copolyester of composition according to A 1 and a molecular weight of 1,670 and about 360 parts of diphenylmethane-4,4'-diisocyanate are reacted together in a melt for about 50 minutes. About 635 parts of the NCO preadduct melt are then introduced into a solution of about 26.3 parts of carbodihydrazide in about 1,874 parts of dimethylformamide with formamide with formation of viscous solution (460 poises/20° C.).

Method of Preparation A 9

About 800 parts of polytetramethylene-ether diol (OH number 109.5) are melted at about 60° C. and stirred together with about 2 parts of a 35 percent solution of $SO_2$ in dioxane for about 10 minutes and then freed from volatile constituents for about 15 minutes at 12 mm. Hg/96° C. The polyether pretreated in this way is then reacted with about 294 parts of diphenylmethane-4,4'-diisocyanate in about 276 parts of dioxane for about 80 minutes at about 80° C. About 424 parts of the cooled NCO preadduct solution (3.0 percent NCO in the solid substance) are stirred into a suspension which has been prepared by placing about 12 parts of solid carbon dioxide into a solution of about 6.82 parts of ethylene diamine and about 0.92 parts of propylene-1,2-diamine in about 907 parts of dimethylformamide, a viscous, homogeneous elastomer solution (468 poises) is obtained in a few minutes.

Method of Preparation A 10

About 425 parts of the NCO preadduct solution from Example A 9 are stirred into a solution heated to about 50° C. of about 11.15 parts of carbodihydrazide in about 913 parts of dimethylformamide, an elastomer solution of 465 poises is obtained.

Method of Preparation A 11

About 800 parts of a polytetramethylene ether diol (molecular weight 1,020) and about 68 parts of toluylene diisocyanate (2,4- and 2,6-isomeric mixture in a ratio of 80:20) and about 50 parts of dioxane are heated together at about 80° C. for about 20 minutes, about 195 parts of diphenylmethane-4,4'-diisocyanate and about 69 parts of dioxane are added, and the reactants are reacted together for a further 33 minutes at about 80° C. to form an NCO preadduct solution.

About 376.2 parts of this NCO preadduct solution are then stirred into a suspension prepared by putting about 10 parts of solid carbon dioxide into a solution of about 5.88 parts of hydrazine hydrate in about 925 parts of dimethylformamide. The elastomer solution (121 poises/20° C.) is treated with the given quantities of stabilizer.

About 1 percent by weight of poly-β-diethylaminoethyl-methacrylate, about 0.5 percent by weight of tris-(3,5-di-tertiary-butyl-4-hydroxybenzyl)mesitylene and about 0.5 percent of 5-chloro-2,(2'-hydroxy-3'-methyl-5-tertiary butyl-phenyl)-benzotriazole are added to the elastomer solution (121 poises/20°B C.) as stabilizers.

PROCESS ACCORDING TO THE INVENTION

Example 1

About 40 parts of 20 percent dimethylformamide solution of polyurethane A 1 are mixed and stirred with about 0.8 part of aluminum sulphate octadecahydrate until the salt has dissolved. After application to a grained metal matrix about 800 cm.$^2$ in area, it is dipped in water, washed and dried at about 80° C. A film having a permeability to water vapor of 2.3 mg./h./cm.$^2$ is produced. When about 5.6 parts of aluminum sulphate octadecahydrate are added, the film has a permeability to water vapor of 8.5 mg./h./cm.$^2$.

The tests indicated in the following Table 2 are carried out in accordance with Example 1.

TABLE 2

| Method of preparation | Electrolyte | Percent based on PU | PWV | PU (percent) in— | Other additive |
|---|---|---|---|---|---|
| A3 | Al$_2$(SO$_4$)$_3$·18H$_2$O | 150 | 10.4 | (15) DMF | |
| A2 | Same as above | 300 | 9.2 | (15) DMF | |
| | do | 100 | 4.1 | (15) DMF | Plus 5% paraformaldehyde. |
| A6 | do | 600 | 3.4 | (15) DMF | |
| A4 | do | 300 | 5.0 | (15) DMA | |
| A9 | do | 300 | 2.2 | (15) DMF | |
| A10 | do | 150 | 1.1 | (15) DMF | |
| A1 | do | 400 | 3.7 | (26) DMF | |
| A1 | do | 100 | 5.5 | (10) DMF | |
| | do | 200 | 9.1 | | |
| | do | 300 | 11.3 | | |
| | do | 400 | 13.8 | | |
| | FeSO$_4$·7H$_2$O | 300 | 3.2 | (25) DMF | |
| | Al$_2$(SO$_4$)$_3$·18H$_2$O | 100 | 7.5 | (10) DMF | Plus 50% ABS polymer plus 10% paraformaldehyde. |
| A1 | Same as above | 50 | 1.6 | (15) DMF | Plus 33% polyvinyl chloride. |
| | BaCl$_2$·2H$_2$O | 150 | 3.9 | (15) DMF | |
| | FePO$_4$·4H$_2$O | 300 | 6.6 | (15) DMF | |
| | NaH$_2$PO$_4$·2H$_2$O | 300 | 2.0 | (15) DMF | |
| A7 | Al$_2$(SO$_4$)$_3$·18H$_2$O | 250 | 2.4 | (26) DMF | |
| A8 | Same as above | 100 | 6.7 | (26) DMF | |
| A5 | do | 100 | 2.3 | (13) DMF | |
| A1 | do | 100 | 1.3 | (25.8) DMF | Plus 50% polyvinyl acetate. |
| | do | 100 | 2.2 | (25.8) DMF | Plus 50% cellulose acetate. |
| A1 | do | 100 | 1.0 | (25.8) DMF | Plus 50% polystyrene. |
| A11 | KAl(SO$_4$)$_2$·12H$_2$O | 50 | 5.4 | (25.8) DMF | |
| A1 | ZnO | 100 | 2.1 | (20.0) DMF | |

NOTE.—PU=polyurethane; PWV=permeability to water vapor measured according to IUP 15, published in "Das Leder" 12 (1961) pp. 86 to 88; PMF=dimethylformamide; DMA=dimethylacetamide.

Example 2

About 40 parts of 26.5 percent polyurethane solution prepared according to A 1 in dimethylformamide are mixed with about 20 parts of aluminum sulphate octadecahydrate and stirred at about 20° C. until a clear dispersion is obtained. The dispersion is then painted on to glass plates of about 800 cm.$^2$ in area and the dimethylformamide removed by washing with ethanol. A microporous film which has a permeability to water vapor of 0.25 mg./h./cm.$^2$ is obtained. When the quantity of electrolyte is doubled (40 parts of aluminum sulphate octadecahydrate), using the same method of procedure a film having a permeability to water vapor of 6.5 mg./h./cm.$^2$ is obtained.

Example 3

About 3.5 parts by volume of 50 percent aqueous aluminum sulphate octadecahydrate solution are stirred into about 65 parts of a 10 percent solution in dimethylformamide of polyurethane A 1 at room temperature by means of a high-speed stirrer (3,000–4,000 rev./min.), the air bubbles are removed in a vacuum, and the product is applied to a glass plate with a wiper blade and dipped in water. After the solvent is washed out, a film having a permeability to water vapor of 1.3 mg./h./cm.$^2$ is obtained.

In an analogous experiment, about 2 parts by volume of 10 percent aqueous cuprammonium sulphate solution are added to about 40 parts of 15 percent dimethylformamide solution of A1 and the reaction product worked up as above. The microporous film produced has a permeability to water vapor of 3.3 mg./h./cm.$^2$.

A 50 percent ferrous ammonium sulphate decahydrate solution is used instead of copper sulphate solution. The film obtained with this has a permeability to water vapor of 1 mg./h./cm.$^2$ Although the invention has been described in considerable detail in the foregoing, it is to be understood that such detail is solely for the purpose of illustration and that many variations can be made from those skilled in the art without departing from the spirit and scope of the invention except as set forth in the claims.

We claim:

1. A process for the production of microporous sheet structures having high permeability to water vapor which comprises preparing a solution of a film forming polyurethane or polyurethane urea polymer, having a molecular weight of at least about 10,000, in a polar solvent, adding from 10 percent to about 600 percent by weight based on the weight of polymer of a water-soluble solid finely divided electrolyte containing water of a crystallization and having a particle size of less than 1 millimeter and having a hydration enthalpy of less than 18 Kcal./mol and a solubility of from about 0.25 g./100 g. to about 150 g./100 g. in dimethylformamide or a hydration enthalpy of more than 18 Kcal./mol and a solubility of from about 0.25 g./100 g. to about 15 g./100 g. in dimethylformamide, applying to and shaping the solution on a substrate, coagulating the shaped solution by dipping in a liquid in which the polyurethane or polyurethane urea polymer is insoluble but in which the electrolyte is soluble, washing with said liquid and drying.

2. The process of claim 1 wherein the polar solvent is dimethylformamide or dimethylacetamide.

3. The process of claim 1 wherein the electrolyte is selected from the group consisting of aluminum sulfate octadecahydrate, barium chloride dihydrate, cobalt-II-nitrate hexahydrate, chromium-III-acetate hydrate, chromium-III-sulphate pentadecahydrate, iron-II-sulfate heptahydrate, iron-III-phosphate tetrahydrate, potassium aluminum sulfate dodecahydrate, magnesium chloride hexahydrate, iron-II-ammonium sulfate hexahydrate, iron-II-ammonium sulfate dodecahydrate, sodium acetate trihydrate, disodium hydrogen phosphate dihydrate and nickel-II-chloride hexahydrate.

* * * * *